July 19, 1966  I. H. CULVER ETAL  3,261,407
HELICOPTER ROTOR SYSTEM
Filed Aug. 5, 1964  4 Sheets-Sheet 1
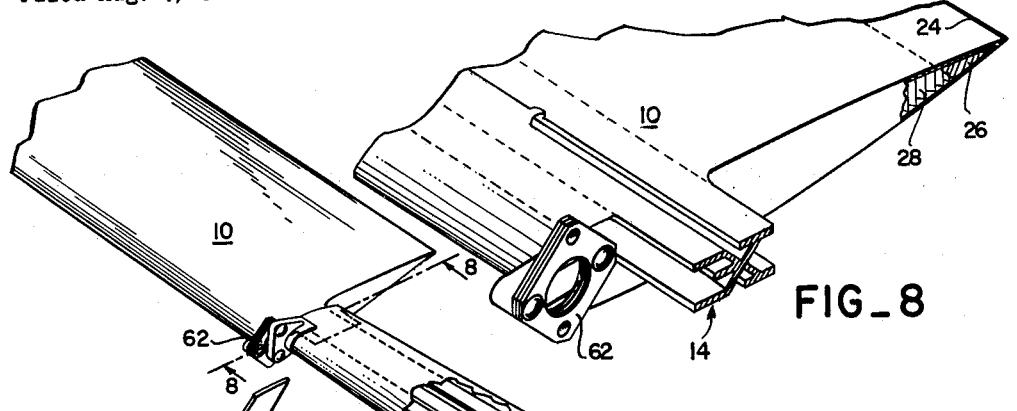
FIG_8
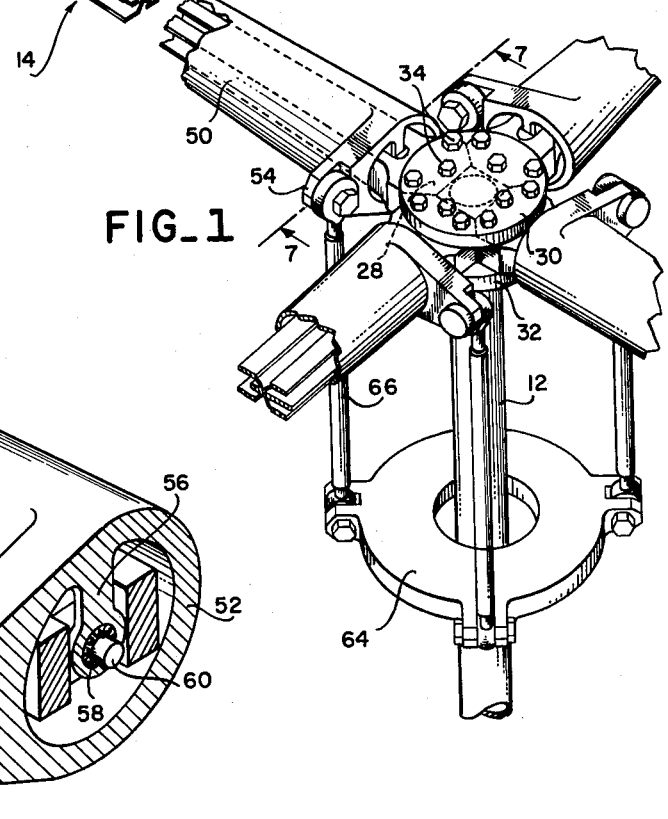
FIG_1
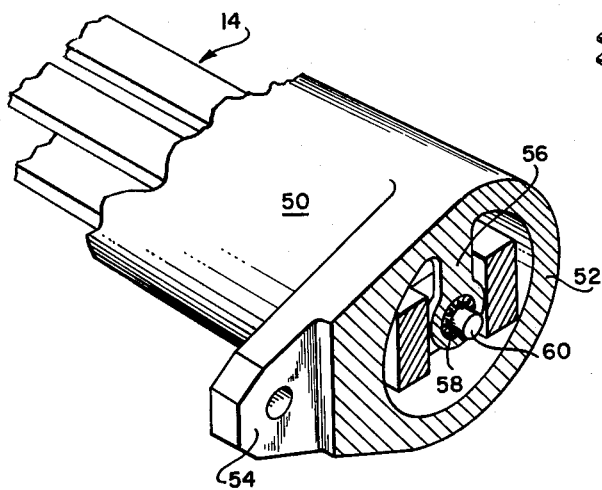
FIG_7
INVENTORS
IRVEN H. CULVER
THOMAS F. HANSON
LANCE G. LOOK
By *George Sullivan*
Agent

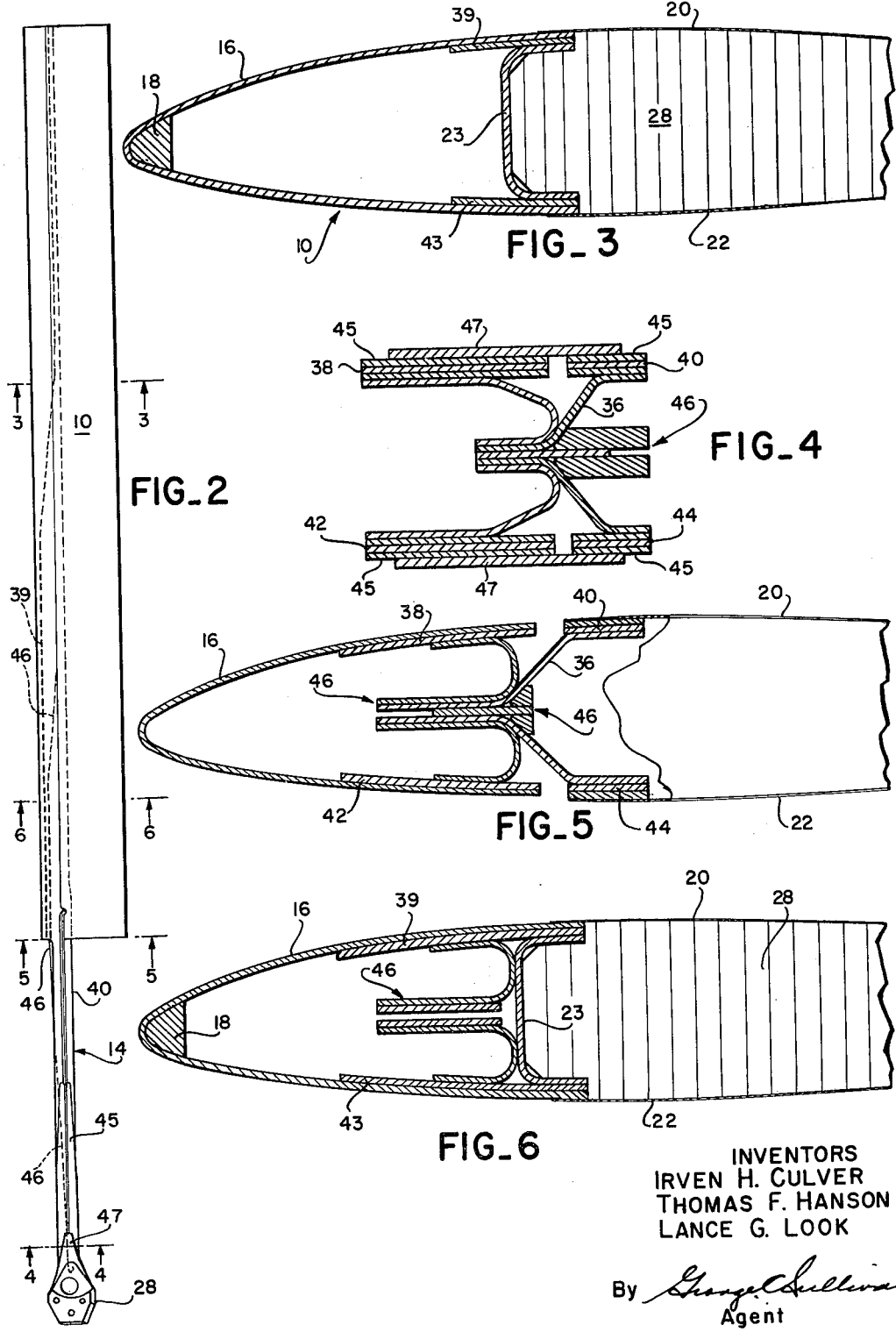

July 19, 1966    I. H. CULVER ETAL    3,261,407
HELICOPTER ROTOR SYSTEM
Filed Aug. 5, 1964      4 Sheets-Sheet 3
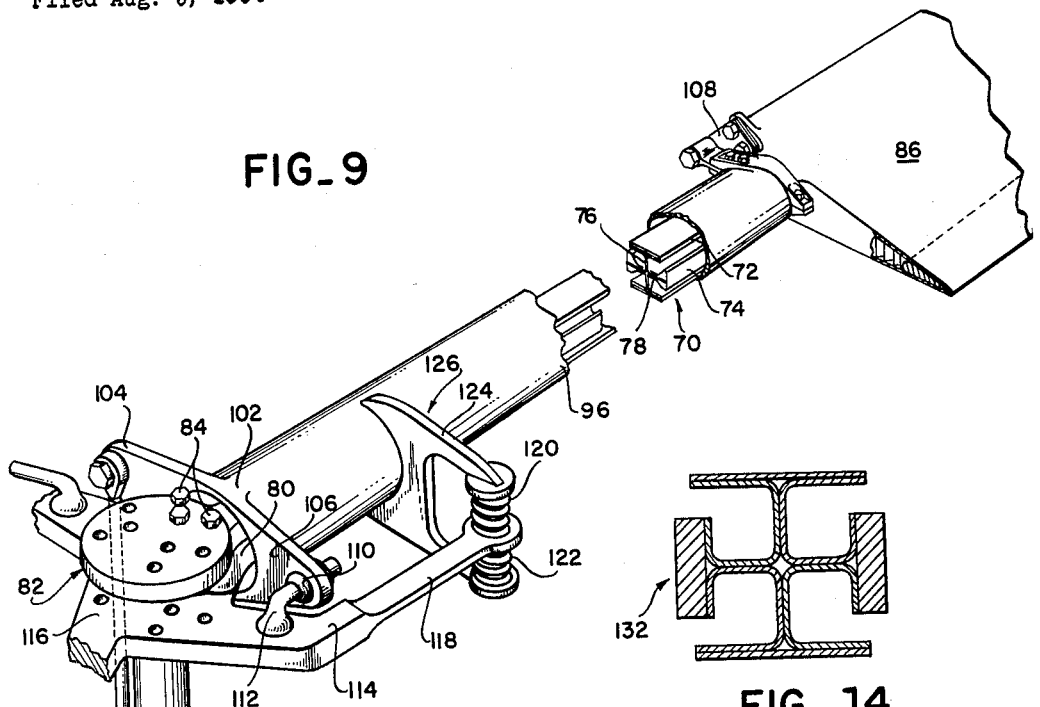
FIG_9
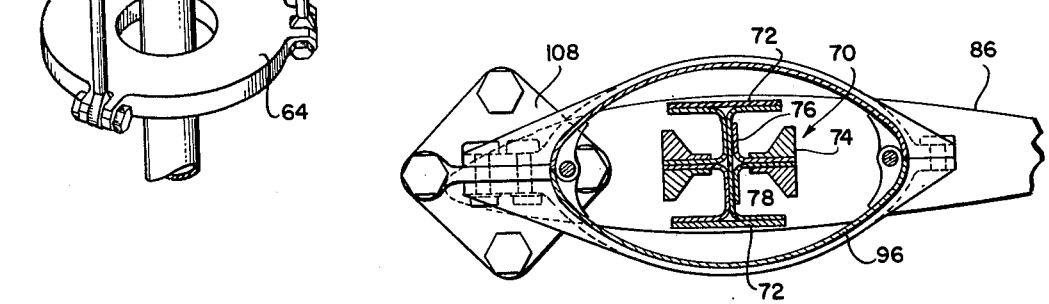
FIG_12
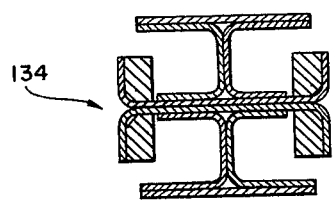
FIG_14
FIG_15
INVENTORS
IRVEN H. CULVER
THOMAS F. HANSON
LANCE G. LOOK
By *George C. Sullivan*
Agent July 19, 1966  I. H. CULVER ETAL  3,261,407
HELICOPTER ROTOR SYSTEM
Filed Aug. 5, 1964  4 Sheets-Sheet 4
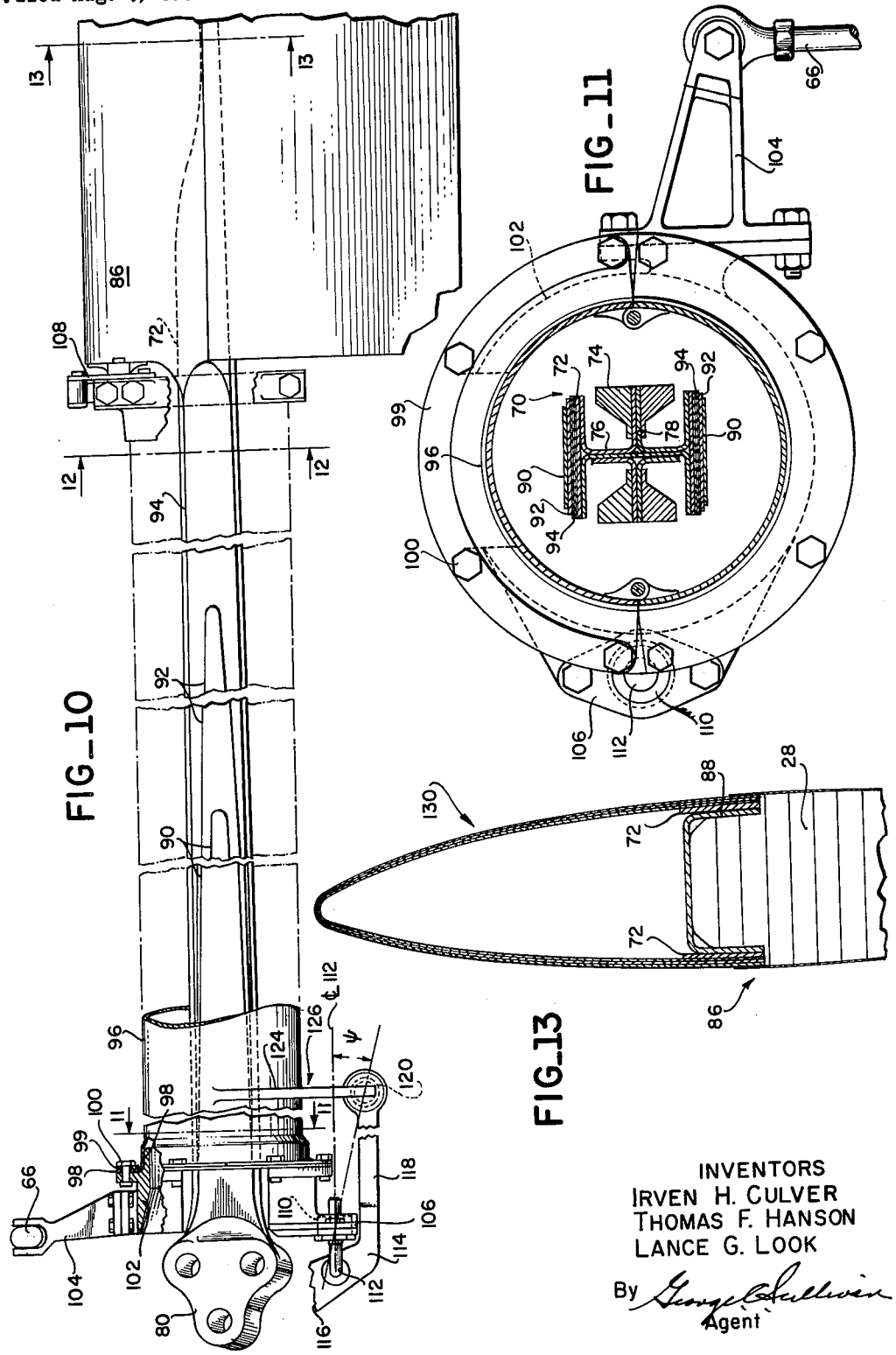
INVENTORS
IRVEN H. CULVER
THOMAS F. HANSON
LANCE G. LOOK
By *George Sullivan*
Agent United States Patent Office 3,261,407
Patented July 19, 1966

3,261,407
HELICOPTER ROTOR SYSTEM
Irven H. Culver, Sunland, Thomas F. Hanson, Newhall, and Lance G. Look, Granada Hills, Calif., assignors to Lockheed Aircraft Corporation, Burbank, Calif.
Filed Aug. 5, 1964, Ser. No. 387,568
6 Claims. (Cl. 170—160.25)

This invention relates to a helicopter rotor system, and more particularly to a rigid, or nonarticulated, rotor system generally of the type described and claimed in U.S. Patents 3,106,964 and 3,135,335.

As more fully described in Patent 3,106,964, a rigid rotor is one wherein the rotor blades are rigidly connected to the mast and have only one degree of freedom; i.e., with respect to the feathering axis for changing blade pitch. The inherent stability of the rigid rotor, as compared to articulated rotors providing for vertical and horizontal pivot axes to permit blade lag and blade flap, is further enhanced in the rotors of Patents 3,106,964 and 3,135,335 by a control gyro consisting of end-weighted arms extending radially from the rotor mast, each arm being pivotally connected to a rotor blade for controlling the pitch of said blade. In the case of the rotor of Patent 3,106,964, the control gyro is attached to the swashplate to form a combined gyro-swashplate member located below the rotor blades. In the case of the rotor of Patent 3,135,335, the control gyro is placed above the rotor blades and is directly attached to the rotor mast, or drive shaft, by means of a constant velocity drive.

Patent 3,106,964 also describes a rotor system wherein the blades have forward sweep; i.e., the blade aerodynamic axis, or 0.25 chord line, is ahead of and at an angle with respect to the feathering, or pitch change, axis. As a result of the forward sweep, when the blade is displaced flapwise, a moment is induced in the blade and the moment is felt as a force on the control gyro which in turn precesses and sends a compensatory signal to the blade for appropriate pitch change. The forward sweep feature results in the compliance or yielding of the rotor to external disturbances and helps to relieve blade moments and to dampen oscillations between the rotor and the helicopter body, as more fully described in the patent. However, this feature somtimes has undesirable side effects when used with blades having a chord, or in-plane, stiffness which is different from the flapping stiffness. At high forward speed and high rotor lift, a destabilizing moment may be produced on the gyro. This effect disappears if the blade elastic stiffnesses are matched chordwise and flapwise; i.e., in a "matched" blade, the force required to displace the blade a given amount horizontally or in-plane when the rotor is not rotating is the same as the force required to displace the blade the same amount vertically or out-of-plane.

Accordingly, it is an object of the present invention to provide a rotor system wherein the blades have matched chordwise and flapwise stiffnesses.

As previously noted, the rigid rotors of the general type presently involved are rotatable about a feathering axis for changing blade pitch. This is accomplished by means of a control link from the control gyro arms to a pitch horn located at the inboard end of each blade. The blade root or rotor hub is provided with feathering bearings which enable the blade to rotate as demanded by the control link. These feathering bearings require relatively heavy structure to house them and also periodic lubrication. As with all moving parts, they must also be periodically inspected for wear and replaced when worn.

Accordingly, it is another object of the present invention to eliminate these feathering bearings and to substitute a flexure member and a torque tube therefor, which are relatively light and require no lubrication.

Generally speaking, the present invention represents an improvement over the previously patented rotor systems in that the present rotors have matched blades; i.e., blades having substantially equal flapping and in-plane elastic stiffness. This matched blade feature is principally provided by a flexure member of a predetermined cross-section which is rigidly attached to the rotor mast and extends radially from the mast through the blade to the blade tip. The blades, spaced some distance from the mast, incorporate the flexure mmber as its chief structural component. For changing the pitch of the blades, each blade is connected to a torque tube by means of a coupling. The torque tube envelops the portion of the flexure member between the blade and the mast and is pivotally connected at its inboard end to the root of the flexure member or to the rotor hub. The in-board end of the torque tube also has a pitch horn which is pivotally connected to the swashplate by a rigid link. The remainder of the control system including the pilot control stick and adjoining linkages may be of the same type as more fully described in Patent 3,135,335.

These and other features of the present invention are more fully and particularly described in conjunction with the accompanying drawings wherein:

FIGURE 1 is a perspective, fragmentary view partly in section, showing schematically one embodiment of the present rotor and a portion of the rotor control mechanism;

FIGURE 2 is a reduced plan view of the rotor blade assembly;

FIGURE 3 is an enlarged fragmentary, sectional view of the blade taken along the line 3—3 in FIGURE 2;

FIGURE 4 is an enlarged sectional view of the flexure member taken along the line 4—4 in FIGURE 2;

FIGURE 5 is an enlarged, fragmentary, sectional view taken along the line 5—5 in FIGURE 2;

FIGURE 6 is an enlarged, fragmentary, sectional view of the blade taken along the line 6—6 in FIGURE 2;

FIGURE 7 is an enlarged, fragmentary, perspective view, partly in section, taken along the line 7—7 in FIGURE 1 and showing the inboard portion of the torque tube and flexure member;

FIGURE 8 is an enlarged, fragmentary, perspective view, partly in section, taken along the line 8—8 in FIGURE 1, and showing the inboard end of the blade and the torque tube coupling;

FIGURE 9 is a perspective, fragmentary view, partly in section, showing schematically a rotor blade and a portion of its control means in another embodiment of the present invention;

FIGURE 10 is a fragmentary, plan view, partly in section, of the rotor blade and control means of FIGURE 9 in greater detail;

FIGURE 11 is an enlarged elevation, sectional view taken along the line 11—11 in FIGURE 10;

FIGURE 12 is an enlarged, fragmentary, elevation, sectional view taken along the line 12—12 in FIGURE 10;

FIGURE 13 is an enlarged, fragmentary, elevation, sectional view taken along the line 13—13 in FIGURE 10;

FIGURE 14 is a sectional, elevation view showing a modified flexure member for use in the embodiment shown in FIGURE 9; and FIGURE 15 is a sectional, elevation view showing still another modified flexure member for use in the embodiment shown in FIGURE 9.

In FIGURE 1, rotor blade 10 comprises one of any number of blades (here, four) attached to a rotor mast 12 by means of a flexure member 14 which extends radially from the mast through the blade to the blade tip (not shown). Blade 10 is spaced some distance away from the mast 12 and incorporates the flexure member 14 as its chief structural component. Typically, as shown in FIGURES 3 and 8, blade 10 is defined by a leading edge portion 16 having a weight balance 18, upper and lower skins 20, 22 converging from the C-shaped spar 23 to the trailing edge 24 stiffened by a filler 26. Blade 10 may be further reinforced by a metal honeycomb core 28. In short, blade 10 is a fairly conventional rotor blade with the exception of the flexure member 14 included therein.

Flexure member 14 has a variable, generally X-shaped, cross section made of laminated pieces bonded together for structural redundancy and is torsionally soft enough to permit blade pitch change. As previously mentioned, member 14 extends radially from the mast 12 to the blade tip as an integral, jointless structurally continuous member. The inboard end of member 14 is bonded to a machined fitting 28 which is adapted to be rigidly connected to mast flanges 30, 32, by means of fasteners 34. From fitting 28 outboard, member 14 varies in cross section, as shown in FIGURES 1, 3, 4, 5 and 6, for the fulfillment of two purposes: (1) to provide for matched in-plane and flapping stiffness, and (2) to provide for blade forward sweep effect.

The generally X-shaped central section 36 of member 14 has a pair of generally co-planar, serif strips 38, 40 at the top of the "X" and another pair of serif strips 42, 44 at the bottom of the "X," as shown in FIGURES 4 and 5. Superimposed on these strips in the portion shown in FIGURE 4 are a split reinforcing doubler member 45 and a doubler member 47. In going from the section shown in FIGURE 4 to that shown in FIGURE 6, the two cross members of the "X" gradually converge, the back portion of the "X" becoming C-shaped spar 23; the strips 38, 40 merge into a single strip 39; and the strips 42, 44 merge into a single strip 43. Also, in going from the section shown in FIGURE 6 to that shown in FIGURE 3, central plate 46, to be described more fully hereinafter, gradually diminishes and disappears, as shown in FIGURE 2, and the front portion of the "X" also gradually diminishes and disappears. This variation in cross section provides the desired matched chordwise and flapwise stiffnesses.

Flexure member 14 also eliminates the use of the feathering bearings of the patented rotor systems and provides for a much lighter design. Other advantages accruing to the use of the present flexure member are reduction in hub aerodynamic drag, hub wear, and hub lubrication requirements.

For controlling blade pitch change, a faired torque tube 50 (FIGURE 1) is disposed in the space between the blade 10 and the rotor mast 12 an envelops flexure member 14 in that space. As best shown in FIGURE 7, torque tube 50 has an inboard end 52 with a pitch horn 54 and an internal, flexurally soft projection 56 carrying a bearing 58 for pivotal movement of the tube about pin 60 attached to the fitting 28. As best shown in FIGURES 1 and 8, the outboard end of torque tube 50 is connected to the blade by means of a flexible coupling 62 of the type known as a Thomas coupling. This type of coupling is sufficiently rigid to transmit torsion forces to the blade for control purposes, but is otherwise yielding so that no bending moments from the blade are transmitted therethrough to the torque tube. The flexible coupling thus eliminates the necessity of matching the flapping and in-plane stiffnesses of the torque tube.

For transmitting pilot control inputs for blade pitch change to the swashplate 64, conventionally mounted on mast 12, a system of linkages similar to that shown in Patent 3,135,335, may be used. Pitch link 66 pivotally connected to the swashplate and to horn 54 transmits the control movements of the swashplate to the torque tube and ultimately to the blade.

The effect of blade forward sweep is achieved by a plate 46 found at the midportion of the "X" in flexure member 14. As shown in FIGURE 4, a substantial portion of plate 46 is disposed rearwardly of the "X" section in relation to the blade leading edge. Plate 46 then gradually starts to move forwardly of the "X" section, as shown in FIGURES 5 and 6. Slightly beyond the section shown in FIGURE 6, plate 46 gradually diminishes and then disappears, as previously described. With this variation in cross section of plate 46, when a blade is displaced flapwise, the result is to introduce a torque about the center of twist of the flexure member, or the feathering axis. This torque induces a tendency in the blade to change pitch and the blade would change pitch if it were not for the presence of the torque tube which resists this tendency. The torque thus created in the torque tube 50 is then transmitted to link 66 and to swashplate 64 as a force input. The swashplate then precesses and sends a compensatory signal back to the blade for appropriate pitch change. Thus, the same effect is achieved by this variation in cross section of the flexure member as is obtained by actually having the aerodynamic axis ahead of the blade feathering axis.

It has been found that the use of the present matched blades virtually eliminates the necessity for a separate control gyro as was required in the previously patented systems. The inertia of the swashplate is in many cases adequate, the swashplate thereby functioning as a control gyro as well as swashplate. However, if desired, a combined gyro-swashplate of the type described in Patent 3,106,964 or an overhead separate gyro of the type described in Patent 3,135,335, both of which being greatly reduced in size, may be used in the present rotor systems. The elimination or the reduction in size of the control gyros reduces the control input forces required and thereby greatly simplifies the control mechanism. In some cases, hydraulic boosters may be eliminated. Thus, there is an over-all saving in weight and a reduction in aerodynamic drag.

FIGURES 9 to 13 show another embodiment of the present invention wherein, except for the portions to be specifically described hereinafter, the same structure and means for controlling the rotor are used as in the previous embodiment. This second embodiment utilizes a flexure member 70 having a substantially constant cross section generally in the form of a Greek cross with flanged portions 72, 74 respectively in the ends of the vertical and horizontal cross arms 76, 78. Flexure member 70 provides the principal means for matching the flapping and in-plane stiffnesses. Member 70 is joined at its inboard end to a machined fitting 80, rigidly attached to flanged rotor hub 82, by suitable fasteners 84, and then extends radially to a point in the rotor blade 86 near line 13—13 (FIGURE 10) where is it gradually phased into the C-shaped spar 88 (FIGURE 13). As flexure member 70 progresses radially, there is a slight, proportionate reduction in size, as shown in FIGURES 11 and 12. To provide structural redundancy, member 70 may be built with laminated pieces as shown, and member 70 may also be reinforced in the portion extending between hub 82 and the blade 86 by doublers 90, 92, and 94 on the upper and lower flanged portions 72.

To transmit pilot control inputs to blade 86, a torque tube 96 having a generally circular cross section at its inboard end (FIGURE 11) and a generally elliptical cross section at its outboard end (FIGURE 12) envelops flexure member 70 between the hub and the blade. As shown in FIGURE 10, tube 96 has a flanged inboard end 98 which is reinforced with a ring 99 and attached with suitable fasteners 100 to a flanged collar 102 bearing a pitch horn 104 on the side of the blade leading edge and a bracket 106 on the opposite side from the horn. Bracket 106 contains a bearing 110 by means of which collar 102 and torque tube 96 are pivotally connected to the hub 82 (FIGURE 9). Pitch horn 104 is adapted to be pivotally connected to pitch link 66 which in turn is pivotally connected to swashplate 64. The outboard end of tube 96 is connected to blade 86 by means of a flexible coupling 108 of the Thomas type.

To provide the effect of blade forward sweep, bracket 106 is connected by means of a spherical central bearing, or ball joint, 110 to a projection 112 on an extension 114 of the lower flange 116 of the hub 82. Extension 114 terminates in a finger 118 of reduced thickness and extending substantially parallel to torque tube 96. The free end of finger 118 is in contact with opposing coil springs 120, 122 held in the jaws 124 of a bracket 126 attached to the torque tube 96. It will be noted in FIGURE 10 that the center of the bearing 110 and the center of springs 120, 122 are angularly offset; i.e., a line drawn between the center of ball joint 110 and the central axis of springs 120, 122 and a center line drawn from the center of ball joint 110 and representing the pitch change axis of the torque tube form the angle $\psi$. The product of the angular displacement of the torque tube centering bearing and the springs and the spring constants of springs 120, 122 and of finger 118, which can be considered as comprising a cantilever spring, determine the magnitude of the forward sweep effect.

More particularly, the forward sweep effect is achieved by the compression of springs 120, 122 when a blade is displaced flapwise. This creates a force on bracket 124 which in turn creates a pitching moment about the pitch change axis of the torque tube. This moment is resisted by the torque tube's connection to swashplate 64 through link 66. The result is a force input to the swashplate which then precesses and sends a compensatory signal back to the blade for appropriate pitch change. Thus, the same effect is achieved by these spring means and its angularly offset position from the torque tube's centering bearing as is obtained by actually having the aerodynamic axis ahead of the blade feathering axis.

In this embodiment, springs 120 and 122 are designed to generate a predetermined pitching moment in the torque tube 96, and therefore it is necessary that the flapwise and chordwise elastic stiffnesses of the flexure member and the torque tube as a unit be matched. This matching is principally achieved by the appropriate shaping of the flexure member. FIGURES 14 and 15 show cross sections of other flexure members 132, 134 which may be used in the present invention. Other torque tubes having a cross section different from that of torque tube 96 may also be used, as long as the flapwise and chordwise elastic stiffnesses of the tube and flexure member selected are matched as a unit.

FIGURE 13 shows a blade construction having a leading edge portion 130 formed of a laminar construction of thin skins. This construction dispenses with the balance weight 18 shown in FIGURE 3, and generally is a lighter blade construction than that shown in FIGURE 3. However, it is to be understood that both blades 10 and 86 are merely exemplary of blades which may be used in the present invention. Other blades differing in spar construction and other features may also be used.

Also, another method of obtaining blade forward sweep in the rotors of the present invention is to actually have the blade aerodynamic axis forward and at an angle to the feathering axis by building a forward bend into the blade at the point of juncture with the flexure member, regardless of which flexure member is used. Also, within the ambit of the present invention, any two or all three of the above described methods for obtaining blade forward sweep effect may be combined in a single rotor blade.

Other modifications and variations will be apparent to those skilled in the art. It is therefore to be understood that the scope of the present invention is to be limited only by the appended claims.

We claim:

1. A helicopter rotor system comprising: a rotor mast; a rotor hub on said mast; a plurality of rotor blades spaced apart from said mast; means for effecting forward sweep of each of the blades; a flexure member extending radially from the hub and forming the chief structural component of each of the blades, said member carrying the blade centrifugal force, blade flapping and in-plane bending moments, and blade shear loads to the hub and said member being torsionally soft to provide for blade pitch change; said member further having a variable, flapping and in-plane elastic stiffnesses; a torque tube pivotally connected to the hub and enveloping the portion of said flexure member between the blade and the mast; a coupling member attached to the blade and to the torque tube for flexible joinder thereof; a swashplate universally mounted on said mast; and a pitch control link pivotally connected to each torque tube and to said swashplate for changing pitch of the blades.

2. A helicopter rotor system comprising: a rotor mast; a rotor hub on said mast; a plurality of rotor blades spaced apart from said mast; a flexure member extending radially from the hub and forming the chief structural component of each of the blades, said member carrying the blade centrifugal force, blade flapping and in-plane bending moments, and blade shear loads to the hub and said member being torsionally soft to provide for blade pitch change; said member further having a variable, generally X-shaped cross section adapted to provide blade forward sweep and matched flapping and in-plane elastic stiffnesses; a torque tube pivotally connected to the hub and enveloping the portion of said flexure member between the blade and the mast; a coupling member attached to the blade and to the torque tube for flexible joinder thereof; a swashplate universally mounted on said mast; and a pitch control link pivotally connected to each torque tube and to said swashplate for changing pitch of the blades.

3. A helicopter rotor system comprising: a rotor mast; a rotor hub on said mast; a plurality of rotor blades spaced apart from said mast; a flexure member extending radially from the hub and forming the chief structural component of each of the blades, said member carrying the blade centrifugal force, blade flapping and in-plane bending moments, and blade shear loads to the hub and said member being torsionally soft to provide for blade pitch change; said flexure member further having a cross section approximating a Greek cross with flanges at the ends of the cross arms; a torque tube having a pivotal connection to the hub and enveloping the portion of flexure member between the blade and the hub; said flexure member and torque tube as a unit having matched flapping and in-plane elastic stiffnesses; a coupling member attached to the blade and to the torque tube for flexible joinder thereof; spring means attached to the trailing edge of the torque tube and to the hub to sense flapwise movement of the blade, the center of said spring means being angularly offset from the center of the torque tube pivotal connection; a swashplate universally mounted on said mast; and a pitch control link pivotally connected to each torque tube and to said swashplate for changing pitch of the blades.

4. A helicopter rotor system comprising: a rotor mast; a rotor hub on said mast; a plurality of rotor blades spaced apart from said mast; a flexure member extending radially from the hub and forming the chief structural component of each of the blades, said member carrying the blade centrifugal force, blade flapping and in-plane bending moments, and blade shear loads to the hub and said member being torsionally soft to provide for blade pitch change; said flexure member further having a cross section approximating a Greek cross with flanges at the ends of the cross arms; a torque tube enveloping the portion of the flexure member between the blade and the hub and having a cross section varying from a circle at its inboard end to an ellipse at its outboard end, said tube also having a bearing for pivotally connecting the tube to the hub; said flexure member and torque tube as a unit having matched flapping and in-plane elastic stiffnesses; a coupling member attached to the torque and to the blade for joinder thereof; a spring means attached to the trailing edge of the torque tube and to the hub to sense flapwise movement of the blade, the center of said spring means being angularly offset from the center of the torque tube bearing; a swashplate universally mounted on said mast; and a pitch control link pivotally connected to each torque tube and to said swashplate for changing pitch of the blades.

5. A helicopter rotor system comprising: a rotor mast; a rotor hub on said mast; a plurality of rotor blades spaced apart from said mast; a flexure member extending radially from the hub and forming the chief structural component of each of the blades, said member carrying the blade centrifugal force, blade flapping and in-plane bending moments, and blade shear loads to the hub and said member being torsionally soft to provide for blade pitch change; said flexure member further having a cross section approximating a Greek cross with flanges at the ends of the cross arms; a torque tube enveloping the portion of said flexure member between the blade and the hub; said torque tube further having a flanged inboard end with a bearing in the trailing portion of the end; a projection extending from the hub to the bearing; said flexure member and torque tube as a unit having matched flapping and in-plane elastic stiffnesses; a coupling member attached to the blade and to the torque tube for flexible joinder thereof; spring means attached to the trailing edge of the torque tube to sense flapwise movement of the blade, the center of said spring means being angularly offset from the center of the torque tube bearing; a finger connecting the center of said spring means and said hub; a swashplate universally mounted on said mast; and a pitch control link pivotally connected to each torque tube and to said swashplate for changing pitch of the blades.

6. A helicopter rotor system comprising: a rotor mast; a rotor hub on said mast; a plurality of rotor blades spaced apart from said mast; a flexure member extending radially from the hub and forming the chief structural component of each of the blades, said member carrying the blade centrifugal force, blade flapping and in-plane bending moments and blade shear loads to the hub and said member being torsionally soft to provide for blade pitch change; said flexure member further having a cross section approximating a Greek cross with flanges at the ends of the cross arms; a torque tube enveloping the portion of the flexure member between the blade and the hub and having a cross section varying from a circle at its inboard end to an ellipse at its outboard end, said tube further having a flanged inboard end with a bearing in the trailing portion of the end; a projection extending from the hub to the bearing; said flexure member and torque tube as a unit having matched flapping and in-plane elastic stiffnesses; a coupling member attached to the blade and to the torque tube for flexible joinder thereof; spring means attached to the trailing edge of the torque tube to sense flapwise movement of the blade, the center of said spring means being angularly offset from the center of said torque tube bearing; a finger connecting the center of said spring means and said hub; a swashplate universally mounted on said mast; and a pitch control link pivotally connected to each torque tube and to said swashplate for changing pitch of the blades.

References Cited by the Examiner

UNITED STATES PATENTS

| | | | |
|---|---|---|---|
| 2,070,657 | 2/1937 | Hafner | 170—160.25 |
| 2,133,043 | 10/1938 | Rothenhoefer | 170—160.5 X |
| 2,475,337 | 7/1949 | Platt | 170—160.5 X |
| 2,575,533 | 11/1951 | Seibel | 170—160.53 X |
| 2,757,745 | 8/1956 | Verhage et al. | 170—160.53 X |
| 2,949,967 | 8/1960 | Jovanovich | 170—160.53 |
| 3,026,942 | 3/1962 | Cresap | 170—160.58 X |
| 3,052,305 | 9/1962 | Jones et al. | 170—160.53 X |
| 3,106,964 | 10/1963 | Culver et al. | 170—160.13 |

FOREIGN PATENTS 418,698   10/1934   Great Britain.

EDGAR W. GEOGHEGAN, *Primary Examiner.*

JULIUS E. WEST, SAMUEL LEVINE, *Examiners.*

E. A. POWELL, JR., *Assistant Examiner.*